United States Patent
Corcoran et al.

(10) Patent No.: US 10,963,717 B1
(45) Date of Patent: Mar. 30, 2021

(54) AUTO-CORRECTION OF PATTERN DEFINED STRINGS

(71) Applicant: Automation Anywhere Inc., San Jose, CA (US)

(72) Inventors: Thomas Corcoran, San Jose, CA (US); Vibhas Gejji, Fremont, CA (US); Stephen Van Lare, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 96 days.

(21) Appl. No.: 16/231,222

(22) Filed: Dec. 21, 2018

(51) Int. Cl.
*G06K 9/03* (2006.01)
*G06K 9/62* (2006.01)
*G06K 9/00* (2006.01)

(52) U.S. Cl.
CPC ........... *G06K 9/03* (2013.01); *G06K 9/00442* (2013.01); *G06K 9/6203* (2013.01); *G06K 9/6262* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,519,786 A * | 5/1996 | Courtney | ............. | G06K 9/6292 382/159 |
| 5,805,747 A * | 9/1998 | Bradford | ............. | G06K 9/6292 382/185 |
| 8,331,739 B1 * | 12/2012 | Abdulkader | ............ | G06K 9/033 382/311 |
| 9,147,275 B1 * | 9/2015 | Hyde-Moyer | ......... | G06K 9/685 |
| 9,367,736 B1 * | 6/2016 | Senechal | ............ | G06K 9/00442 |
| 9,384,423 B2 * | 7/2016 | Rodriguez-Serrano | ...................... | G06K 9/72 |
| 9,858,492 B2 * | 1/2018 | Bhardwaj | ................ | G06K 9/18 |
| 2008/0059431 A1 * | 3/2008 | Aoki | ..................... | G06F 16/319 |
| 2013/0108159 A1 * | 5/2013 | Abdulkader | ............. | G06K 9/34 382/177 |
| 2018/0082154 A1 * | 3/2018 | Kalyuzhny | ............... | G06K 9/18 |
| 2018/0137349 A1 * | 5/2018 | Such | ........................ | G06N 3/08 |
| 2019/0179855 A1 * | 6/2019 | Hu | .......................... | G06F 40/232 |
| 2019/0251167 A1 * | 8/2019 | Krishnapura Subbaraya | .............. | G06N 3/0454 |
| 2019/0311193 A1 * | 10/2019 | Ackley | ................. | G06F 40/232 |
| 2019/0370393 A1 * | 12/2019 | Finch | .................... | G06F 40/274 |
| 2020/0151503 A1 * | 5/2020 | Wang | .................... | G06K 9/6256 |

* cited by examiner

*Primary Examiner* — Cindy Trandai
(74) *Attorney, Agent, or Firm* — Appleton Luff

(57) ABSTRACT

A computer implemented method and system for correcting error produced by Optical Character Recognition (OCR) of text contained in an image encoded document. An error model representing frequency and type of errors produced by Optical Character Recognition Engine is generated. An OCR character string generated by OCR is retrieved. A user-defined pattern of a plurality of character strings is retrieved, where each character string represents a possible correct representation of characters in the OCR character string. The OCR character string is compared to each of the above generated character strings and a 'likelihood score' is calculated based on the information from the error model. The character string with the highest 'likelihood score' is presumed to be the corrected version of the OCR character string.

20 Claims, 7 Drawing Sheets

| IBM Plex Mono | Calibri | Dosis |
|---|---|---|
| I1:|]8B7/ l1!|]8B7/ | I1!|]8B7/ l1!|]8B7/ | l1!|]8B7/ |

FIG. 2

| 302 → | 0 | 1 | / | 2 | 3 | / | 8 | 8 |
|---|---|---|---|---|---|---|---|---|
| 304 → | 0 | 1 | / | 2 | 3 | / | B | B |
| 306 → |   |   |   |   |   |   | S | S |

FIG. 3

| 402 → | 0 | 1 | / (403) |      | 2 | 3 | / | 8 | 8 | NULL (405) |
|---|---|---|---|---|---|---|---|---|---|---|
| 404 → | 0 | 1 | NULL | 2 | 3 | / | B | B | . |
| 406 → |   |   | D |   |   |   | S | S | I |

FIG. 4

| 502 → | 0 | 1 | / | 2 | 3 | / | 8 | 8 |
|---|---|---|---|---|---|---|---|---|
| 504 → | 0 | 1 | 2 | 3 | / | B | B | . |
| 506 → |   |   | S | S | S | S | S | S |

|     | A    | B    | C    | D    | E    | F    | G    | H   | I    |
|-----|------|------|------|------|------|------|------|-----|------|
| A   | 4086 | 1    | 0    | 0    | 1    | 0    | 1    | 1   | 1    |
| B   | 2    | 1466 | 1    | 4    | 3    | 0    | 2    | 6   | 2    |
| C   | 2    | 1    | 2861 | 0    | 0    | 0    | 17   | 0   | 0    |
| D   | 0    | 1    | 1    | 1561 | 1    | 0    | 1    | 4   | 0    |
| E   | 0    | 8    | 16   | 0    | 2178 | 53   | 0    | 44  | 7    |
| F   | 1    | 2    | 1    | 0    | 33   | 1240 | 0    | 26  | 1    |
| G   | 0    | 0    | 5    | 0    | 0    | 0    | 909  | 1   | 2    |
| H   | 18   | 2    | 0    | 0    | 0    | 4    | 0    | 785 | 0    |
| I   | 0    | 0    | 1    | 0    | 1    | 0    | 0    | 8   | 2313 |
| J   | 0    | 0    | 0    | 0    | 0    | 0    | 0    | 0   | 7    |
| K   | 11   | 0    | 0    | 0    | 0    | 1    | 0    | 0   | 0    |
| L   | 1    | 1    | 1    | 0    | 1    | 1    | 0    | 1   | 3    |
| M   | 1    | 2    | 0    | 1    | 0    | 0    | 0    | 0   | 7    |
| N   | 1    | 1    | 2    | 0    | 0    | 0    | 0    | 0   | 0    |
| NUL | 80   | 13   | 104  | 22   | 40   | 27   | 22   | 13  | 130  |
| O   | 1    | 0    | 3    | 1    | 1    | 0    | 2    | 3   | 1    |
| P   | 3    | 0    | 0    | 9    | 0    | 12   | 0    | 2   | 0    |
| Q   | 0    | 0    | 0    | 0    | 0    | 0    | 0    | 0   | 0    |
| R   | 0    | 2    | 1    | 2    | 0    | 3    | 1    | 7   | 0    |
| S   | 0    | 0    | 3    | 1    | 1    | 0    | 1    | 3   | 0    |
| T   | 0    | 1    | 0    | 1    | 2    | 1    | 2    | 1   | 54   |
| TE  | 0    | 0    | 0    | 0    | 0    | 0    | 0    | 0   | 0    |
| U   | 0    | 0    | 0    | 1    | 2    | 0    | 0    | 0   | 7    |
| V   | 0    | 1    | 0    | 0    | 0    | 0    | 0    | 0   | 0    |
| W   | 0    | 0    | 0    | 0    | 0    | 0    | 0    | 0   | 1    |
| X   | 8    | 0    | 0    | 0    | 0    | 0    | 0    | 0   | 0    |
| Y   | 0    | 0    | 0    | 0    | 0    | 0    | 0    | 0   | 0    |
| Z   | 0    | 0    | 0    | 0    | 0    | 0    | 0    | 0   | 0    |

| | | | | | | | | |
|---|---|---|---|---|---|---|---|---|
| 802 → | 0 | 1 | / | 2 | 3 | / | B | B |
| 804 → | 0 | 1 | / | 2 | 3 | / | 8 | 8 |
| 806 → |   |   |   |   |   |   | S | S |

FIG. 9

| | | | | | | | | | TOTAL |
|---|---|---|---|---|---|---|---|---|---|
| 802 → | 0 | 1 | / | 2 | 3 | / | B | B | |
| 804 → | 0 | 1 | / | 2 | 3 | / | 8 | 8 | |
| 902 → | .92 | .88 | .77 | .93 | .89 | .79 | .005 | .005 | 1.4e-5 |

FIG. 10

| | | | | | | | | | TOTAL |
|---|---|---|---|---|---|---|---|---|---|
| 802 → | 0 | 1 | / | 2 | 3 | / | B | B | |
| 1002 → | 0 | 1 | / | 2 | 3 | / | 8 | 5 | |
| 1004 → | .92 | .88 | .77 | .93 | .89 | .79 | .005 | .003 | 8.6e-6 |

AUTO-CORRECTION OF PATTERN DEFINED STRINGS

FIELD OF THE DISCLOSURE

This disclosure relates generally to the field of data processing systems and more particularly to recognition of text in image documents.

BACKGROUND

Computerized Optical Character Recognition (OCR, also optical character reader) is the electronic conversion of images of typed, handwritten or printed text into machine-encoded text, such as from a scanned document or a photo of a document. OCR is widely used as a form of information entry from printed paper data records to permit electronic editing, searching, storage, and for use in machine processes such as cognitive computing, machine translation, (extracted) text-to-speech, key data and text mining. All OCR systems produce some characteristic or systematic error. This is similar to in principle to spelling errors people make as they type. Spelling/typing errors may come from several factors including phonetic characteristics of letter sequences, the physical proximity of keys on a keyboard, or confusion with homophonic words. While the accuracy of OCR systems has improved over time, there continues to be a need for OCR systems with lower error rates. This is particularly important in automated business processes where the accuracy of OCR is of increased importance.

In the business context, some business documents are exchanged in an electronic format that permits automatic, or semi-automatic importation of required information into a computer program for processing. A large volume of business documents however are exchanged in an image format, such as paper, or an electronic representation of an image format, such in Portable Document Format (PDF), or other image formats (TIFF, JPEG, etc.). Often it is necessary to employ OCR to convert data encoded in image form into machine-encoded text. A common example is conversion from a known image format, such as PDF, TIFF or JPEG, among others, into a text encoded format. OCR operates to provide a form of information entry to allow printed paper data records to be converted to a format that can be electronically edited, searched, stored more compactly, displayed on-line, and used in various machine processes. As computerization of business processes has increased, the accuracy of OCR has become increasingly important. Unfortunately, as noted above, known OCR programs tend to produce characteristic or systematic error. There is accordingly a need for an improved OCR system that provides a level of accuracy required for demanding applications such as business processes.

SUMMARY

A computer implemented method and system for correcting error produced by Optical Character Recognition (OCR) of text contained in an image encoded document. A user-defined pattern of a plurality of possible groundtruth character strings is retrieved, where each possible groundtruth character string represents a correct representation of characters in the character string. An OCR character string generated by OCR is retrieved. The OCR character string is compared to each of the possible groundtruth character strings. If the OCR character string does not match any of the possible groundtruth character strings, then one or more of the characters in the OCR character string is modified to cause a match between the OCR character string and one of the possible groundtruth character strings. An error model is representing frequency of errors in the domain of the possible groundtruth character strings is generated and employed in the modification of characters. Such a method and system is highly effective in correcting systematic error in OCR systems and in particular those that arise from font characteristics including: kerning (space between letters), letter weight, and in general the visual contrast between characters.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 shows a sequence of characters in three different typefaces.

FIGS. 3 and 4 show a groundtruth string of characters and two sample outputs.

FIG. 5 shows output of an alternative embodiment.

FIG. 6 illustrates an example error model with reduced vocabulary.

FIG. 8 illustrates character wise aligned strings.

FIG. 9 illustrates the strings of FIG. 8 weighted in accordance with an embodiment.

FIG. 10 is a table showing a next most likely candidate as generated by the OCR correction system 100.

DETAILED DESCRIPTION

Figure 1:
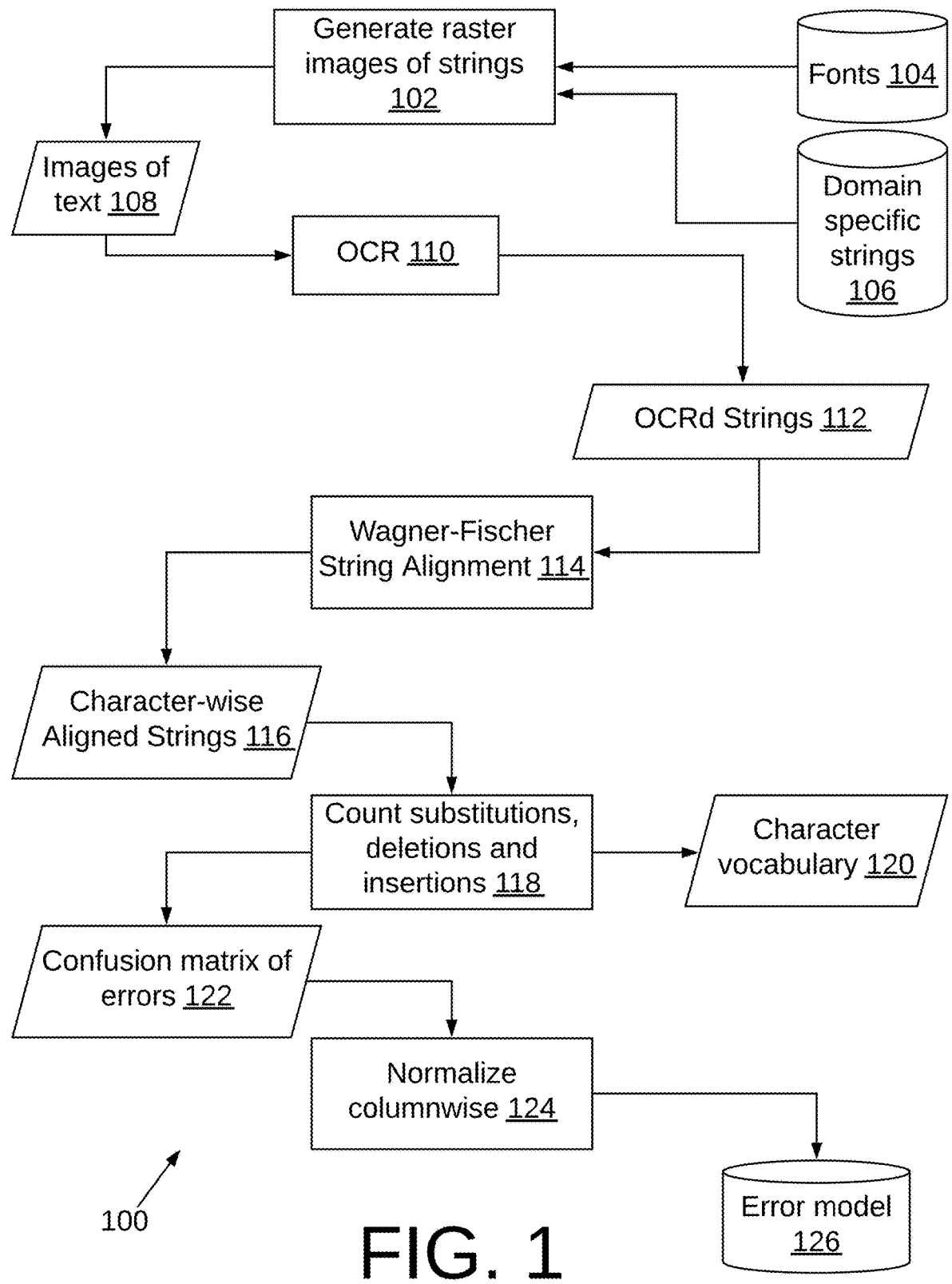
FIG. 1 is a high-level block diagram illustrating generation of an error model in accordance with an embodiment of an OCR correction system 100.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Systematic error in OCR systems is highly influenced by font characteristics including: kerning (space between letters), letter weight, and in general the visual contrast between characters. For example, consider the sequence of characters in three different typefaces as seen in FIG. 2 which shows the following characters in three different typefaces, IBM Plex Mono, Calibri, and Dosis: "I", "1", "!", "|", "l", "]", "8", "B", "7", and "/". To ensure proper understanding of these characters they may be described as: capital eye ("I"), one ("1"), exclamation point ("!"), pipe ("|"), lower-case elle ("l"), right square bracket ("["), eight ("8"), capital bee ("B"), seven ("7"), and forward slash ("/").

IBM Plex™ Mono is a monospaced font designed to give maximum visual contrast between character sequences. All characters in IBM Plex™ Mono are visually distinct. Calibri is a sans-serif font and is the default font for Microsoft® Word with medium intrafont visual contrast, resulting in the following characters being visually similar: "I", "l", "]", and "1". Additionally, the characters "7" and "/" differ only by a small margin in their diagonal stroke, in contrast to this pair in IBM Plex™ Mono where the thickness of the strokes differ as well. Dosis is a sans-serif font with minimal intrafont contrast. Here the characters "I", "|", and "l" are almost identical. Additionally, the characters "1" (one) and "!" (exclamation point) show very low visual contrast. The kerning of this font is also quite small compared to the other two fonts. OCR systems applied on these fonts will then tend to have predictable error results, showing conflation between the "I", "1", "|", "l", and perhaps square bracket characters "[" and "]". Similarly, the "8" and "B" characters may often be conflated, as well as the "7" and "/" characters. Given enough data about how an OCR system of interest tends to make mistakes, the likelihood that one character will be confused for any other character can be statistically quantified. This is referred herein as an error model. The error model can be constructed from looking at the differences between verified text and the text that the OCR system of interest outputs. This can advantageously be created synthetically by generating images using a particular font, or it may be gathered organically from documents in the wild where the font is not necessarily known. In practice the disclosed error model can be used to determine how likely one string may be mistaken for another string.

To make sure the OCR output is correct, validation rules or dictionaries are often used. When an OCR output does not match the validation rule or is not present in a dictionary, it can be flagged as an error. Given the disclosed error model, it is possible to make a guess at which word in the dictionary should actually be. For example, if the system encounters a date field OCR output given as "01/23/BB" and it is known that capital B is often confused for 8, the system can suggest the correction "01/23/88". Traditionally, spellcheck systems often use dictionaries of terms. However, in the case of document processing, validation rules are often just as important as dictionaries of terms. In some cases, every possible permutation of a given pattern may be generated, thus creating a dictionary from which candidate correction strings can be chosen.

The disclosed error model datasets may be created in two different ways, organically and synthetically. In the organic collection process, a large volume (e.g. 70K) of text segments, retrieved from a document corpus, may be collected and transcribed by humans to generate text segments. The same segments are then also OCRd with a conventional OCR program, such as tesseract 4, further details of which may be found at github.com, to produce OCR text output. In the synthetic creation process, shown in FIG. 1, a pipeline for generating images from text is created. In one embodiment, up to n different typefaces (e.g. n=10), including popular serif and sans-serif typefaces and up to m different font (e.g. m=4) styles 104 from each typeface are used. To generate a segment, a word from a large list (e.g. 100 k) of words 106 from a particular domain, for example taken from vectorized utility bills is selected. This represents a groundtruth set of word strings. The domains can include a variety of types of business documents, for example, invoices, health records, purchase orders. A random font is selected, a random font size is selected, and the image is then rasterized 102 utilizing the font and the parameters chosen (text, font size). This is repeated for all words in the word list 106, which contains groundtruth strings. The generated images 108 are then OCRd 110 with a conventional OCR program to produce OCR text output in the form of text segments 112.

The next step in creating the error model is to determine the character alignment between each groundtruth string 106 and each OCR generated text segment 112. Preferably, three edit operations on strings are employed. That is, any string can be transformed into any other string using a sequence of character insertions, deletions or substitutions. This alignment may be characterized as the particular sequence of these operations used to transform the input string to the output string. For example, as seen in FIG. 3, the top row 302 is the groundtruth string, the second row 304 is the OCRd output string, and the third row 306 is the alignment string indicating that 8 in row 302 is substituted for B, in row 304, twice. In FIGS. 3, 4 and 5, a substitution is designated in the bottom row (306, 406, 506) with the letter "S", a deletion is designated with the letter "D" and an insertion is designated with the letter "D". A more complex example is shown in FIG. 4, where the groundtruth string is seen at 402, the OCRd output string is seen at 403 and the alignment string is seen at 406. In FIG. 4, the forward slash seen at 403 is deleted (a mapping from/to NULL) and a period is inserted, seen at 405 (a mapping from NULL to "."). Of course, there may be more than one unique alignment string for any given input/output string pair. A preferred alignment string is preferably defined as the one that minimizes cost, assuming that in practice, each insertion, deletion, and substitution have some fixed cost. In one embodiment, a cost of 1 is used for each operation. In an alternative embodiment, a costlier alignment is shown in FIG. 5 where six substitutions can be seen in row 506. In other embodiments, the cost for the various operations can be varied, such as for example, assigning a higher cost to one more operations. In such an embodiment, a substitution may have a lower cost (e.g. one) than an insertion or deletion which may have a cost of two.

To generate the alignment string 116, the Wagner-Fischer algorithm is preferably used, at 114, to produce a cost matrix of edit operations and a matrix of edit operations between the two strings of characters (i.e. the groundtruth string and the OCRd string). The minimum cost is computed as a result of the Wagner-Fischer algorithm, and the edit operations algorithm is backtracked to find the correct alignment sequence 116. Once an optimal alignment sequence 116 is determined for each input/output pair, a matrix of the rates of substitution, deletion, and insertion can be calculated at 118 on a character-level basis to ultimately produce a confusion matrix of errors 122, seen in FIG. 6. This matrix 122 is preferably normalized columnwise at 124 (by dividing by the mean in each column) to produce the error model 126, which is a model of how often characters are substituted for each other, how often any particular character is deleted, and how often any particular character is inserted. Said another way, the table 126 takes the form of a lookup table that provides information on the frequency of an error. The character vocabulary 120 generated by operation 118 is a listing of the characters that the OCR correction system 100 can predict. In FIG. 6, numbers on the diagonal indicate no error was made. For example, "A" was recognized as "A" 4096 times. The leftmost column indicated at 602 represents groundtruth characters, and the topmost row indicated at 604 represents the predicted character. So, row "T", column "I" shows that the character "T" was recognized as (i.e. misidentified as) the character "I" 54 times.

Figure 7:
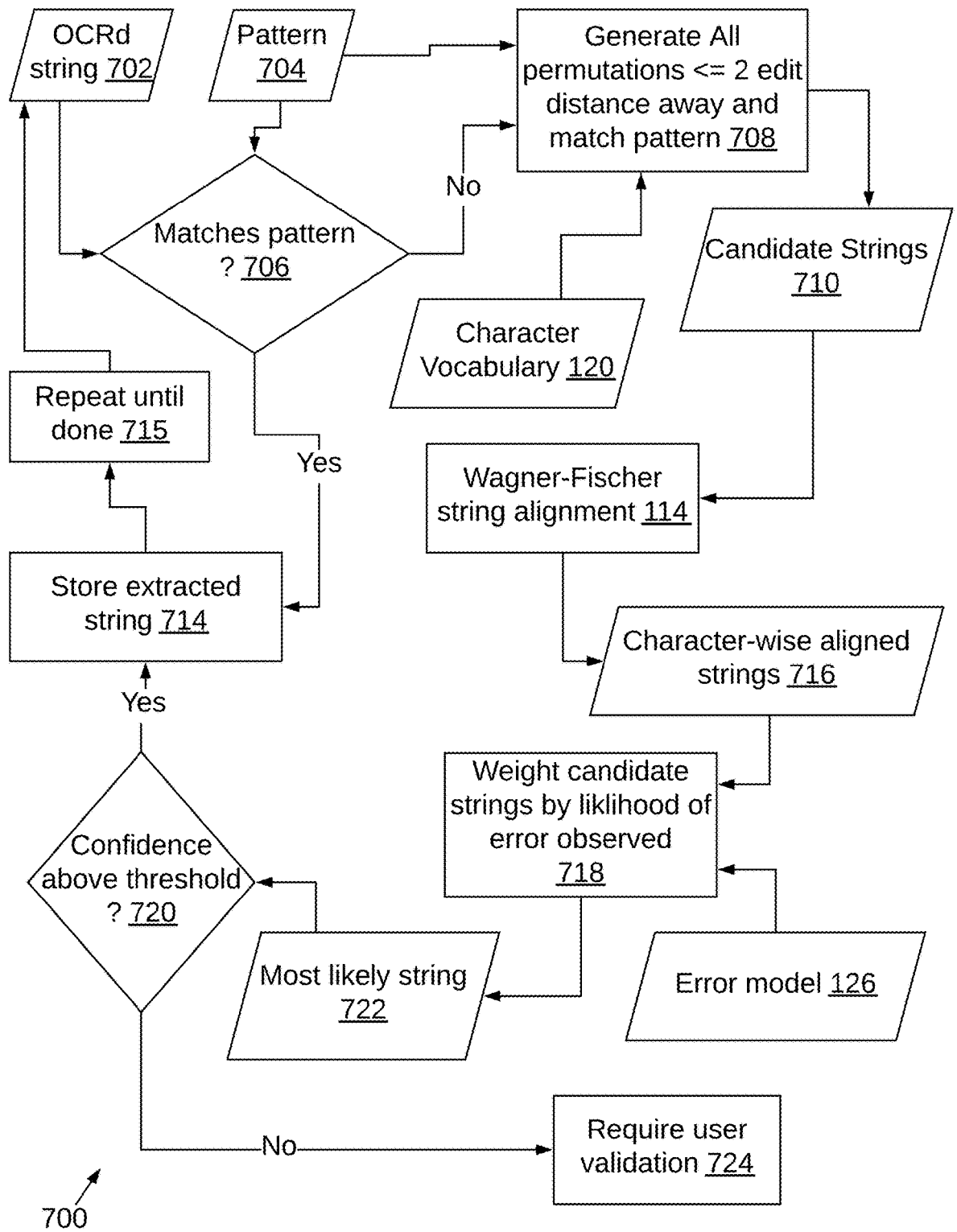
FIG. 7 illustrates operation of an embodiment of system 100 to correct OCR errors.

FIG. 7 illustrates operation of an embodiment 700 in a production environment to correct OCR output 702. In order to predict what correction should be made to an OCRd string, the system 700 needs a list of possible candidates to choose from. To generate candidates, preferably all permutations of the OCRd string that are <=2 edit distance away are created using the character vocabulary found in the error model 126. Then this list is pared down to the strings that match the given pattern definition which may be defined in the form of a regular expression or exist in the predefined dictionary to generate patterns 704. In the event of an exact match (706) the extracted string is stored at 714 and the process at 715 completes or proceeds to a subsequent string 702. In the event there is no exact match between the OCRd string 702 and a user-defined pattern 704, generated for a specific field (e.g. "01/01/99" for a date field), a list of all possible values a field can take on is created, and the most likely candidate string from this list is selected. The user-defined patterns 704 preferably include patterns for the commonly encountered strings in a document, such as the date field example noted above, where the format of the field is defined and contained in the user-defined patterns 704. Another example would be the city and state format of an address. Generation of the list of all possible values is performed at 708 by first finding all strings that are within a predetermined edit distance (here the edit distance is selected equal to 2) from the OCRd string 702. This is advantageously performed for two reasons: 1) if a string has more than 2 errors, it becomes increasingly unlikely that a naive system like this will be able to correct for the amount of noise in the string and 2) creating a candidate shortlist reduces the computation time required to determine the most likely matching string. Once a short list of candidates 710, representing possible groundtruth character strings, is created, an alignment string, employing the Wagner-Fischer algorithm is preferably used, at 114, to produce a cost matrix of edit operations and a matrix of edit operations. The minimum cost is computed as a result of the Wagner-Fischer algorithm, and the edit operations algorithm is backtracked to find the correct alignment sequence to generate character-wise aligned strings 716 (this is seen in FIG. 8), which are then weighted at 718 by the error model 126 to determine how likely the alignment sequence is. An example is seen in FIG. 8 showing the aforementioned operations on the date string "01/23/88" which has been incorrectly OCRd as "01/23/BB" seen at 802 and corrected at 804 with substitutions seen at 806. The string is weighted at 718 by looking up the cost of each operation in the error model to generate a most likely string candidate 722, with associated costs for each character in the string, seen at 902 in FIG. 9. The total cost is also calculated by multiplying the individual costs and is shown in the right-most column of row 902. The next likely candidate that is computed is shown in FIG. 10 at 1002 as "01/23/8'5". The cost of generation of string 1002 is seen at 1004.

The string 01/23/88 will then be chosen by the error model 126 as it contains the most likely sequence of characters given the OCRd string input and all possible candidate strings belonging to the dictionary of strings within an edit distance of 2. To calculate a confidence value for this candidate, the sum of all candidate likelihoods is taken as the denominator and the candidate likelihood as the numerator as shown in the equation below.

$$C_{best} = \frac{\max(\text{likelihoods})}{\Sigma \text{likelihoods}}$$

Finally, this string is then passed onto the user at 724 for validation if $C_{best}$ is determined at 720 to be lower than a given confidence threshold. Otherwise it can be stored into the system without requiring human validation.

Figure 11:
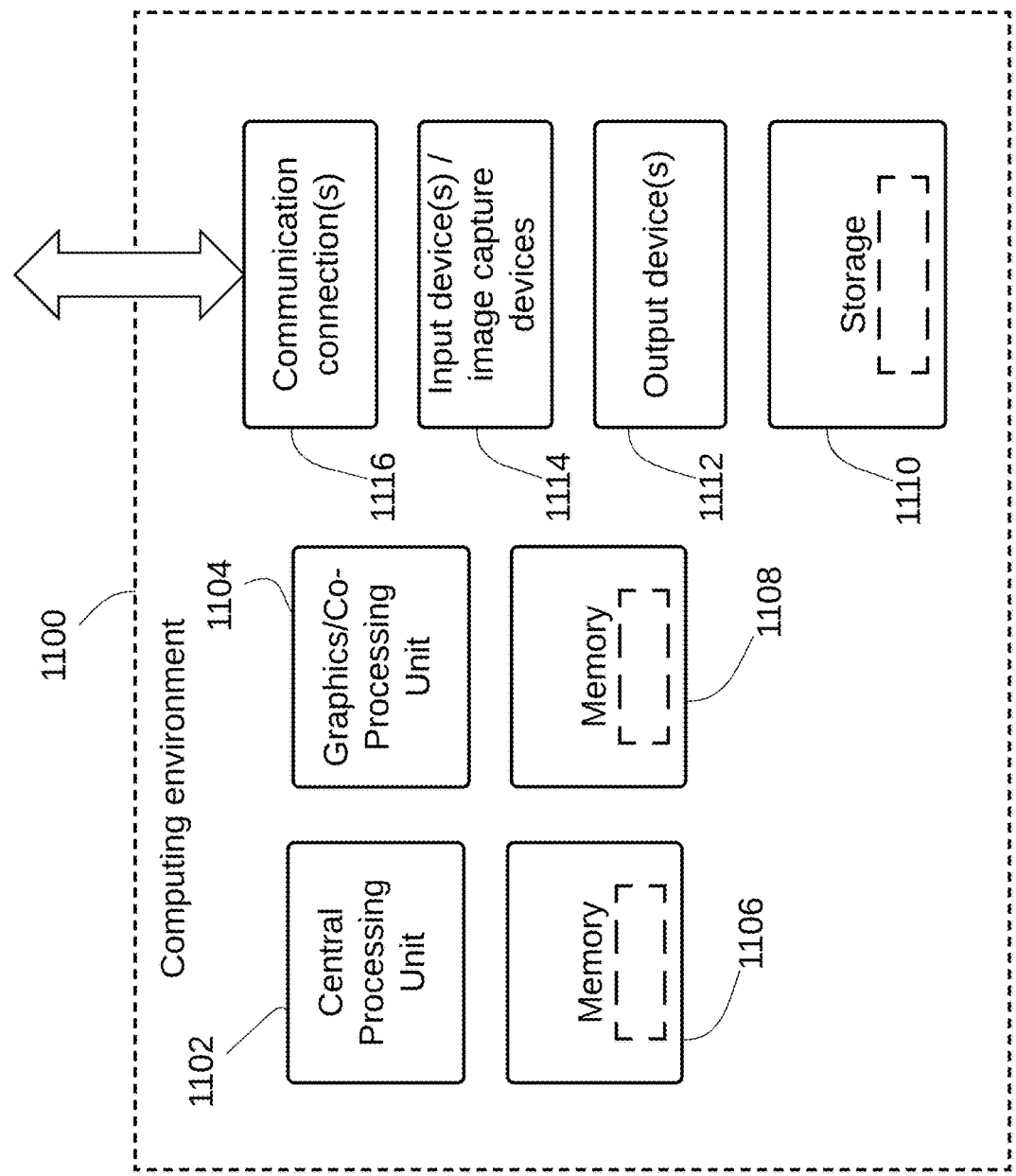
FIG. 11 illustrates a block diagram of hardware that may be employed in an implementation of the system 100.

FIG. 11 depicts a generalized example of a suitable general-purpose computing system 1100 in which the described innovations may be implemented in order to improve the processing speed and efficiency with which the computing system 1100 operates to perform the functions disclosed herein. With reference to FIG. 11 the computing system 1100 includes one or more processing units 1102, 1104 and memory 1106, 1108. The processing units 1102, 1106 execute computer-executable instructions. A processing unit can be a general-purpose central processing unit (CPU), processor in an application-specific integrated circuit (ASIC) or any other type of processor. The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components in FIG. 11 may be standard hardware components, or alternatively, some embodiments may employ specialized hardware components to further increase the operating efficiency and speed with which the system 100 operates.

Computing system 1100 may have additional features such as for example, storage 1110, one or more input devices 1114, one or more output devices 1112, and one or more communication connections 1116. An interconnection mechanism (not shown) such as a bus, controller, or network interconnects the components of the computing system 1100. Typically, operating system software (not shown) provides an operating system for other software executing in the computing system 1100, and coordinates activities of the components of the computing system 1100.

The tangible storage 1110 may be removable or non-removable, and includes magnetic disks, magnetic tapes or cassettes, CD-ROMs, DVDs, or any other medium which can be used to store information in a non-transitory way and which can be accessed within the computing system 1100. The storage 1110 stores instructions for the software implementing one or more innovations described herein.

The input device(s) 1114 may be a touch input device such as a keyboard, mouse, pen, or trackball, a voice input device, a scanning device, or another device that provides input to the computing system 1100. For video encoding, the input device(s) 1114 may be a camera, video card, TV tuner card, or similar device that accepts video input in analog or digital form, or a CD-ROM or CD-RW that reads video samples into the computing system 1100. The output device(s) 1112 may be a display, printer, speaker, CD-writer, or another device that provides output from the computing system 1100.

The communication connection(s) 1116 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer implemented method for correcting error produced by Optical Character Recognition (OCR) of text contained in an image encoded document, comprising:
   retrieving patterns of a plurality of possible groundtruth character strings, each possible groundtruth character string representing a correct representation of characters in the character string;
   retrieving an OCR character string generated by OCR;
   comparing the OCR character string to each of the possible groundtruth character strings;
   in response to the OCR character string not matching any of the possible groundtruth character strings, identifying non-matching characters and individually replacing only non-matching characters in the OCR character string to cause a match between the OCR character string and one of the possible groundtruth character strings.

2. The computer implemented method of claim 1 wherein individually replacing only non-matching characters in the OCR character string to cause a match between the OCR character string and one of the possible groundtruth character strings comprises:
   generating a plurality of variant strings of the OCR character string, each variant string within a predetermined edit distance from the OCR character string;
   comparing each variant string to the OCR character string, modifying each variant string to match the OCR character string and generating an error weighting value indicative of the amount of modification of an associated variant string;
   selecting a likely variant string as a function of the error weighting value associated with the likely variant string;
   comparing the error weighting value to a predetermined threshold value; and
   in response to the error weighting value exceeding the predetermined threshold value, storing the likely variant string as a corrected version of the OCR character string.

3. The computer implemented method of claim 2 further comprising:
   tagging the likely variant string for subsequent manual review in response to the error weighting value associated with the likely variant string being less than the predetermined threshold value.

4. The computer implemented method of claim 2 wherein generating an error weighting value indicative of the amount of modification of an associated variant string comprises:
   accessing a lookup table that provides information on the frequency of OCR error by character.

5. The computer implemented method of claim 4 wherein the lookup table is generated by:
   accessing a word corpus containing a plurality of character strings, each character string representing a set of characters found in documents within a particular domain;
   generating for at least a subset of the character strings, a plurality of image representations for each character string in the subset of character strings, wherein the plurality of image representations for each character string represent images of the corresponding character string in a variety of typefaces, font styles and font sizes;
   generating, by OCR, for each of the image representations, an OCR textual representation;
   comparing each OCR textual representation to its corresponding character string to identify OCR errors; and
   maintaining a count by character of OCR error to generate the lookup table containing a matrix of values identifying a number of times each character in the plurality of character strings is converted by OCR to itself and a number of times each character in the plurality of strings is converted, by character, to each other character.

6. The computer implemented method of claim 5 wherein the count by character of OCR error includes deletion of the character, substitution of the character and insertion of the character.

7. The computer implemented method of claim 5 further comprising generating a character vocabulary comprising a listing of characters correctly generated by the OCR.

8. The computer implemented method of claim 5 wherein the values in the lookup table are normalized to adjust for frequency of occurrence of each character.

9. The computer implemented method of claim 5 wherein comparing each OCR textual representation to its corresponding character string to identify OCR errors comprises, performing character alignment to identify for each character, any substitution, deletion and insertion by the OCR.

10. A system for automating validation of documents generated from Optical Character Recognition (OCR) of image encoded documents, comprising:
    data storage containing a character vocabulary comprising a listing of characters correctly generated by the OCR, and a matrix of mappings of frequency of error by the OCR for each character; and a processor operatively coupled to the data storage and configured to execute instructions that when executed cause the processor to identify and correct error by the OCR by:
  retrieving a pattern of a plurality of possible groundtruth character strings, each possible groundtruth character string representing a correct representation of characters in the character string;
  retrieving an OCR character string generated by OCR;
  comparing the OCR character string to each of the possible groundtruth character strings;
  in response to the OCR character string not matching any of the possible groundtruth character strings, identifying non-matching characters and individually replacing only non-matching characters in the OCR character string, as a function of the matrix of mappings, to cause a match between the OCR character string and one of the possible groundtruth character strings.

11. The system of claim 10 wherein individually replacing only non-matching characters in the OCR character string to cause a match between the OCR character string and one of the possible groundtruth character strings comprises:
  generating a plurality of variant strings of the OCR character string, each variant string within a predetermined edit distance from the OCR character string;
  comparing each variant string to the OCR character string, modifying each variant string to match the OCR character string and generating, by accessing the matrix of mappings, an error weighting value indicative of the amount of modification of each variant string;
  selecting a likely variant string as a function of an error weighting value associated with the likely variant string;
  comparing the error weighting value to a predetermined threshold value; and
  in response to the error weighting value exceeding the predetermined threshold value, storing the likely variant string as a corrected version of the OCR characters.

12. The system of claim 10 wherein the processor is further configured to execute instructions that when executed cause the processor to:
  in response to the error weighting value associated with the likely variant string being less than the predetermined threshold value, tagging the likely variant string for subsequent manual review.

13. The system of claim 10 wherein the matrix of mappings is generated by instructions that when executed cause the processor to:
  access a word corpus containing a plurality of character strings, each character string representing a set of characters found in documents within a particular domain;
  generate for at least a subset of the character strings, a plurality of image representations for each character string in the subset of character strings, wherein the plurality of image representations for each character string represent images of the corresponding character string in a variety of typefaces, font styles and font sizes;
  generate, by OCR, for each of the image representations, an OCR textual representation;
  compare each OCR textual representation to its corresponding character string to identify OCR errors; and
  maintain a count by character of OCR error to generate the matrix of mappings containing a matrix of values identifying a number of times each character in the plurality of character strings is converted by OCR to itself and a number of times each character in the plurality of strings is converted, by character, to each other character.

14. The system of claim 13 wherein the count by character of OCR error includes deletion of the character, substitution of the character and insertion of the character.

15. The system of claim 13 further comprising instructions that when executed cause the processor to: generate a character vocabulary comprising a listing of characters correctly generated by the OCR.

16. The system of claim 15 wherein the values in the lookup table are normalized to adjust for frequency of occurrence of each character.

17. The system of claim 16 wherein comparing each OCR textual representation to its corresponding character string to identify OCR errors comprises, performing character alignment to identify for each character, any substitution, deletion and insertion by the OCR.

18. A tangible storage medium, having stored thereupon one or more program modules comprising computer-executable instructions for execution on a computer system, the computer-executable instructions executing on a server processor to cause the computer system to implement a computer-implemented method for correcting error produced by Optical Character Recognition (OCR) of text contained in an image encoded document, comprising:
  retrieving patterns of a plurality of possible groundtruth character strings, each possible groundtruth character string representing a correct representation of characters in the character string;
  retrieving an OCR character string generated by OCR;
  comparing the OCR character string to each of the possible groundtruth character strings;
  in response to the OCR character string not matching any of the possible groundtruth character strings, identifying non-matching characters and individually replacing only non-matching characters in the OCR character string to cause a match between the OCR character string and one of the possible groundtruth character strings.

19. The tangible storage medium of claim 18 wherein individually replacing only non-matching characters in the OCR character string to cause a match between the OCR character string and one of the possible groundtruth character strings comprises:
  generating a plurality of variant strings of the OCR character string, each variant string within a predetermined edit distance from the OCR character string;
  comparing each variant string to the OCR character string, modifying each variant string to match the OCR character string and generating an error weighting value indicative of the amount of modification of an associated variant string;
  selecting a likely variant string as a function of the error weighting value associated with the likely variant string;
  comparing the error weighting value to a predetermined threshold value; and
  in response to the error weighting value exceeding the predetermined threshold value, storing the likely variant string as a corrected version of the OCR character string.

20. The tangible storage medium of claim 18 wherein the computer implement method further comprises:
  in response to the error weighting value associated with the likely variant string being less than the predetermined threshold value, tagging the likely variant string for subsequent manual review.

* * * * *